United States Patent
Nakamichi

(10) Patent No.: US 9,524,135 B2
(45) Date of Patent: Dec. 20, 2016

(54) IMAGE FORMING APPARATUS, IMAGE FORMING SYSTEM, AND IMAGE FORMING METHOD FOR DIVING AND OUTPUTTING A PRINT JOB

(71) Applicant: Motoki Nakamichi, Tokyo (JP)

(72) Inventor: Motoki Nakamichi, Tokyo (JP)

(73) Assignee: KONICA MINOLTA BUSINESS TECHNOLOGIES, INC., Tokyo (JP)

(*) Notice: Subject to any disclaimer, the term of this patent is extended or adjusted under 35 U.S.C. 154(b) by 0 days.

(21) Appl. No.: 13/843,912

(22) Filed: Mar. 15, 2013

(65) Prior Publication Data
US 2013/0242346 A1    Sep. 19, 2013

(30) Foreign Application Priority Data

Mar. 16, 2012  (JP) ................................. 2012-059946

(51) Int. Cl.
    *G06F 3/12* (2006.01)
(52) U.S. Cl.
    CPC ........... *G06F 3/1296* (2013.01); *G06F 3/1215* (2013.01); *G06F 3/1241* (2013.01); *G06F 3/1291* (2013.01)
(58) Field of Classification Search
    CPC .... G06F 3/1215; G06F 3/1241; G06F 3/1264; G06F 3/1291; G06F 3/1296; G06F 3/1204; G06F 3/126; G06F 3/1261; G06F 3/1285; G06F 3/1203; G06F 3/1212; G06G 15/6538; G06G 2201/1696; H04N 1/00639; H04N 1/00931; G03G 15/5083; G03G 15/6538; G03G 2215/00109

(Continued)

(56) References Cited

U.S. PATENT DOCUMENTS 7,812,985 B2 * 10/2010 Nguyen et al. .............. 358/1.15
2005/0214017 A1    9/2005 Isobe et al.
(Continued)

FOREIGN PATENT DOCUMENTS

JP    2005-103985 A     4/2005
JP     2005271296 A    10/2005
(Continued)

OTHER PUBLICATIONS

English Machine Translation of JP 2008-149686-A (Matsuo, Published Jul. 3, 2008).*

(Continued)

*Primary Examiner* — Benny Q Tieu
*Assistant Examiner* — Juan M Guillermety
(74) *Attorney, Agent, or Firm* — Holtz, Holtz & Volek PC

(57) ABSTRACT

Provided is an image forming system where a plurality of image forming apparatuses for printing an image on a sheet based on a job, and outputting the image are connected with one another in a communicable manner, including a communication unit to carry out the communication, and a control unit to manage the job, and control the communication unit, where the control unit divides the job for sequentially processing a plurality of steps into a plurality of divided step jobs, executes a former part of the divided step jobs on an image forming apparatus which can execute the former part of the divided step jobs, and reserves a latter part of the divided step jobs on an image forming apparatus which can execute the latter part of the divided step jobs, and is different from the image forming apparatus, thereby enabling efficient execution of the job.

32 Claims, 11 Drawing Sheets

(58) Field of Classification Search
USPC ................................................ 358/1.14, 1.15
See application file for complete search history.

(56) References Cited

U.S. PATENT DOCUMENTS

| | | | |
|---|---|---|---|
| 2006/0187484 A1* | 8/2006 | Noda ........................... | 358/1.15 |
| 2006/0238777 A1* | 10/2006 | Anno et al. .................... | 358/1.1 |
| 2007/0036574 A1* | 2/2007 | Nakamichi ........ | G03G 15/5012 399/82 |
| 2007/0081186 A1* | 4/2007 | Numata ............. | H04N 1/00352 358/1.15 |
| 2007/0263232 A1* | 11/2007 | Nakajima et al. ............. | 358/1.1 |
| 2009/0087242 A1* | 4/2009 | Sato .............................. | 399/407 |
| 2009/0241117 A1* | 9/2009 | Dasgupta .............. | G06F 9/5038 718/101 |
| 2009/0279137 A1* | 11/2009 | Mori ........................... | 358/1.15 |
| 2011/0164282 A1* | 7/2011 | Okada et al. ................ | 358/1.15 |
| 2011/0304878 A1* | 12/2011 | Yanazume et al. .......... | 358/1.15 |
| 2012/0113465 A1* | 5/2012 | Matsuyama et al. ........ | 358/1.15 |
| 2012/0154862 A1* | 6/2012 | Wakana et al. .............. | 358/1.15 |

FOREIGN PATENT DOCUMENTS

| | | |
|---|---|---|
| JP | 2006-305760 A | 11/2006 |
| JP | 2008-149686 A | 7/2008 |

OTHER PUBLICATIONS

Japanese Office Action dated May 28, 2014 issued in counterpart Japanese Application No. 2012-059946.
Chinese Office Action dated Dec. 31, 2014, issued in counterpart Chinese Application No. 201310079098.X.
Chinese Office Action (and English translation thereof) dated Sep. 14, 2015, issued in counterpart Chinese Application No. 201310079098.X.

* cited by examiner

IMAGE FORMING APPARATUS, IMAGE FORMING SYSTEM, AND IMAGE FORMING METHOD FOR DIVING AND OUTPUTTING A PRINT JOB

CROSS-REFERENCE TO RELATED APPLICATION

This application is based on Japanese Patent Application No. 2012-059946 filed with Japan Patent Office on Mar. 16, 2012, the entire content of which is hereby incorporated by reference.

BACKGROUND OF THE INVENTION

Field of the Invention

The present invention relates to an image forming apparatus for printing an image on a sheet, and outputting the sheet based on a job, an image forming system where a plurality of the image forming apparatuses are connected one other via a network or the like, and an image forming method.

Description of the Related Art

The image forming apparatus prints an image on a sheet and outputs the sheet based on a job, and a post-processing apparatus further carries out post-processing according to a setting of the job. The job is set to carry out a sequence of processing, and the entire job is reserved and executed. On this occasion, if the job is input into an operating apparatus, and the job is only a print output, the job can be executed on another apparatus connected via a network or the like. On the other hand, the post-processing is carried out only on an apparatus which can carry out the post-processing.

As a result, if the entire job is reserved, the print including the post-processing has to be started after a preceding job is finished. Moreover, if a job including post-processing is input into an apparatus on which a post-processing apparatus is not available, the post-processing itself cannot be carried out.

Therefore, in Japanese Patent Application Laid-Open No. 2008-149686, a post-processing to be newly carried out is allowed to be reserved even if entire processing including post-processing is being carried out in an image forming system, thereby reducing labor for the operation.

Moreover, Japanese Patent Application Laid-Open No. 2005-103985 proposes, an image forming system enabling reservation for a post-processing job relating to an independent operation of a post-processing apparatus is proposed.

However, on the conventional apparatuses, it is necessary to wait for the completion of a preceding job, and then to carry out printing and post-processing, and the problem of low productivity is not sufficiently resolved.

The present invention is devised in view of the foregoing situation, and has objects to provide an image forming system, an image forming apparatus, and an image forming method which can carry out printing on another apparatus first without waiting for processing for a preceding job, and then can carry out only post-processing after the preceding job is finished, thereby finishing the entire job earlier, resulting in an efficient output.

SUMMARY OF THE INVENTION

To achieve at least one of the above mentioned objects, an image forming system reflecting a first aspect of the present invention is an image forming system wherein a plurality of image forming apparatuses for printing an image on a sheet based on a job, and outputting the image are connected with one another in a communicable manner, including a communication unit to carry out the communication, and a control unit to manage the job, and control the communication unit, wherein the control unit divides the job for sequentially processing a plurality of steps into a plurality of divided step jobs, executes a former part of the divided step jobs on an image forming apparatus which can execute the former part of the divided step jobs, and reserves a latter part of the divided jobs on another image forming apparatus which can execute the latter part of the divided jobs, and is different from the image forming apparatus.

In the image forming system reflecting the first aspect of the present invention, the plurality of image forming apparatuses preferably include at least one image forming apparatus provided a post-processing apparatus which can carry out manual post-processing.

In the image forming system reflecting the first aspect of the present invention, the control unit preferably indicates an execution time and makes reservation to the image forming apparatus based on a timing in which the former part of the divided step jobs finishes.

In the image forming system reflecting the first aspect of the present invention, the control unit preferably receives a notification on a timing in which the former part of the divided step jobs finishes from the image forming apparatus executing the divided step job upon the reservation, and preferably reserves an execution time on another image forming apparatus which is different from the image forming apparatus.

In the image forming system reflecting the first aspect of the present invention, the plurality of image forming apparatuses are preferably connected with one another in a communicable manner via one of a server and an external terminal, and the control unit is preferably provided in the server or the external terminal.

In the image forming system reflecting the first aspect of the present invention, the plurality of image forming apparatuses are preferably connected with one another in a communicable manner, and the control unit is preferably provided in any of the image forming apparatuses.

In the image forming system reflecting the first aspect of the present invention, the control unit preferably causes another image forming apparatus to execute the former part of the divided step jobs, and preferably reserves the latter part of the divided step jobs on the own image forming apparatus.

In the image forming system reflecting the first aspect of the present invention, the control unit preferably receives a notification on a timing in which the job finishes from the other image forming apparatus executing the former part of the divided step jobs, and preferably reserves an execution time for the latter part of the divided step jobs on the own image forming apparatus.

In the image forming system reflecting the first aspect of the present invention, the control unit preferably executes the former part of the divided step jobs on the own image forming apparatus, and preferably reserves the latter part of the divided step jobs on another image forming apparatus which can execute the latter part of the divided step jobs.

In the image forming system reflecting the first aspect of the present invention, the control unit preferably notifies another image forming apparatus of the job finish timing of the divided step job executed on the own image forming apparatus, and preferably reserves an execution time for the latter part of the divided step jobs on the other image forming apparatus.

In the image forming system reflecting the first aspect of the present invention, the job for sequentially processing a plurality of steps preferably includes a first step and a second step, the divided step jobs preferably include a first divided step job and a second divided step job, and the second step preferably relates to post-processing.

In the image forming system reflecting the first aspect of the present invention, if the control unit determines that an image forming apparatus to which the job is input alone cannot execute the entire job, and that there are image forming apparatuses which can respectively execute parts of steps of the job, and the entire job can be distributed to and processed by a plurality of image forming apparatuses, the control unit preferably divides the job into a plurality of divided step jobs depending on the image forming apparatuses which can execute the job.

An image forming apparatus reflecting a first aspect of the present invention is an image forming apparatus for printing an image on a sheet based on a job, and outputting the image, the image forming apparatus being connected with another image forming apparatus in a communicable manner, including a communication unit to carry out the communication, and a control unit to manage the job, and control the communication unit, wherein the control unit preferably divides the job for sequentially processing a plurality of steps into a plurality of divided step jobs, preferably executes a former part of the divided step jobs on the own image forming apparatus, preferably notifies another image forming apparatus which can execute a latter part of the divided step jobs of the latter part of the divided step jobs via the communication unit, and preferably reserves the latter part of the divided step jobs in the another image forming apparatus.

An image forming apparatus reflecting a second aspect of the present invention is an image forming apparatus for printing an image on a sheet based on a job, and outputting the image, the image forming apparatus being connected with another image forming apparatus in a communicable manner, including a communication unit to carry out the communication, and a control unit to manage the job, and control the communication unit, wherein the control unit preferably divides the job for sequentially processing a plurality of steps into a plurality of divided step jobs, preferably causes another image forming apparatus which can execute a former part of the divided jobs to execute the former part of the divided step jobs via the communication unit, and preferably reserves a latter part of the divided step jobs on the own image forming apparatus.

In the image forming apparatus reflecting the first or second aspect of the present invention, when the control unit determines that an image forming apparatus into which the job is input alone cannot execute the entire job, and that there are image forming apparatuses which can respectively execute parts of steps of the job, and the entire job can be distributed to and processed by a plurality of image forming apparatuses, preferably the control unit preferably divides the job into a plurality of divided step jobs depending on the image forming apparatuses which can execute the job.

An image forming apparatus reflecting a third aspect of the present invention is an image forming apparatus for printing an image on a sheet based on a job, and outputting the image, the image forming apparatus being connected with another image forming apparatus in a communicable manner, including a communication unit to carry out the communication, and a control unit to manage the job, and control the communication unit, wherein the control unit preferably receives a former part of divided step jobs out of a plurality of divisions of the job for sequentially processing a plurality of steps via the communication unit from another image forming apparatus, and preferably executes the former part of divided step jobs.

An image forming apparatus reflecting a fourth aspect of the present invention is an image forming apparatus for printing an image on a sheet based on a job, and outputting the image, the image forming apparatus being connected with another image forming apparatus in a communicable manner, including a communication unit to carry out the communication, and a control unit to manage the job, and control the communication unit, wherein the control unit preferably receives a reservation for a latter part of the divided step jobs out of a plurality of divisions of the job for sequentially processing a plurality of steps via the communication unit from another image forming apparatus.

In the image forming apparatus reflecting the second or fourth aspect of the present invention, if the control unit receives another job before execution of the reserved divided step job, and the other job can be finished before the execution of the reserved divided step job, the control unit preferably executes the other job, and if the other job cannot be finished before the execution of the reserved divided step job, the control unit preferably reserves the other job as a job to be executed after the reserved divided step job.

In the image forming apparatus reflecting any one of the first to fourth aspect of the present invention, the image forming apparatus which receives the reservation preferably includes a post-processing apparatus which can carry out manual processing.

In the image forming apparatus reflecting any one of the first to fourth aspect of the present invention, the job for sequentially processing a plurality of steps preferably includes a first step and a second step, the divided step jobs preferably include a first divided step job and a second divided step job, and the second step preferably relates to post-processing.

An image forming method of the present invention is an image forming method for printing an image on a sheet based on a job, and outputting the image, including preferably dividing the job for sequentially processing a plurality of steps into a plurality of divided step jobs, a step of executing a former part of the divided step jobs, and a step of notifying another image forming apparatus, which can execute a latter part of the divided step jobs, of the latter part of the divided step jobs, and preferably reserving the latter part of the divided step jobs to the another image forming apparatus.

DETAILED DESCRIPTION OF THE EMBODIMENTS

A description will now be given of an embodiment of the present invention.

Figure 1:
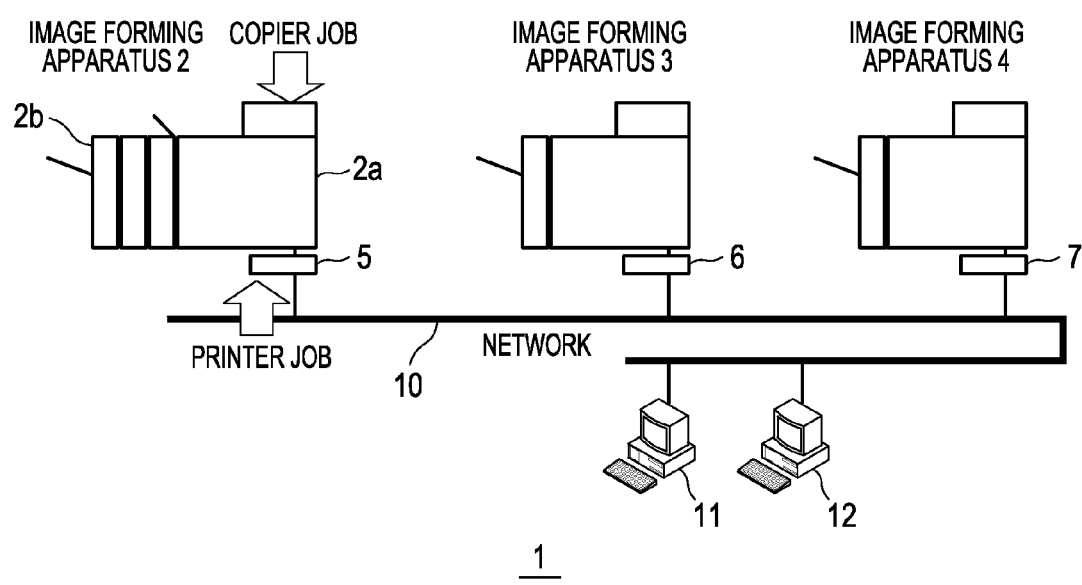
FIG. 1 is a system configuration diagram showing an image forming system according to an embodiment of the present invention.

FIG. 1 shows a configuration of an image forming system where multiple image forming apparatuses 2, 3, and 4 to which a copier job can be input are connected to a network 10, and PC terminals 11 and 12 are connected to the network 10.

The image forming apparatus 2 has a configuration where a post-processing apparatus 2b is connected to an image forming apparatus main body 2a, and the post-processing apparatus is not illustrated for the image forming apparatuses 3 and 4. Manual processing is available on at least one post-processing apparatus, and the post-processing apparatus 2b has a manual processing function enabling a printed sheet to be placed, and allowing a manual instruction to carry out predetermined post-processing.

The image forming apparatuses 2, 3, and 4 are respectively connected via printer controllers 5, 6, and 7 to the network 10. As a result, the image forming apparatuses 2, 3, and 4 can receive and execute a printer job transmitted from another image forming apparatus and the PC terminals 11 and 12, and can transfer a printer job to another image forming apparatus, thereby causing the other image forming apparatus to execute the job.

Figure 2:
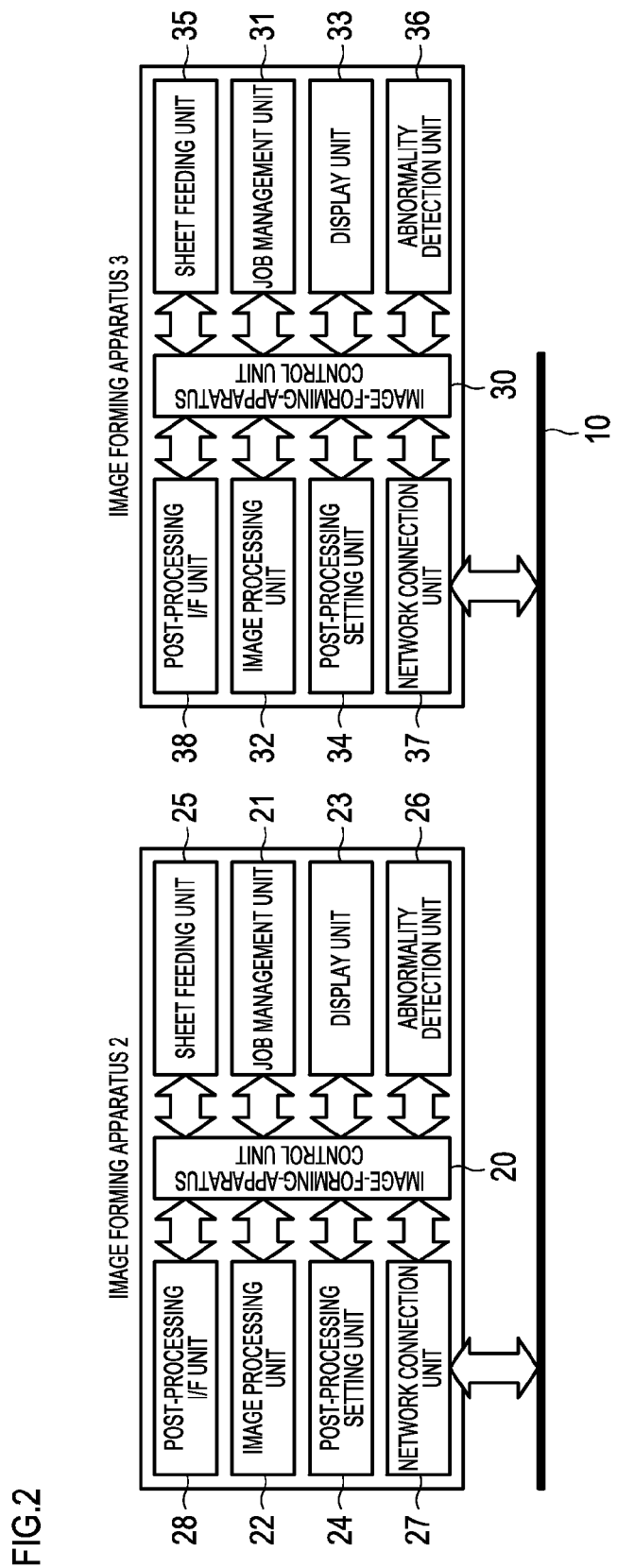
FIG. 2 is a control block diagram according to the embodiment of the present invention.

FIG. 2 is a diagram including control blocks for the image forming apparatuses 2 and 3.

The image forming apparatus 2 includes an image-forming-apparatus control unit 20 for controlling the entire image forming apparatus, and respective components are connected to the image-forming-apparatus control unit 20 in a controllable manner.

The image forming apparatus 2 includes a JOB management unit 21, an image processing unit 22, a display unit 23, a post-processing setting unit 24, a sheet feeding unit 25, an abnormality detection unit 26, a network connection unit 27, and a post-processing I/F unit 28 as main components in addition to the image-forming-apparatus control unit 20.

The image-forming-apparatus control unit 20 corresponds to a control unit of the present invention, and includes a CPU and a storage unit including a ROM for storing a program used to operate the CPU, a RAM for primarily storing data, an image memory for storing image data, a nonvolatile memory for storing setting data, process control parameters, sheet information, and model information on the image forming apparatus 2, and the like. The image-forming-apparatus control unit 20 controls the entire image forming apparatus 2, and reads the setting data registered to the nonvolatile memory, thereby operating the image forming apparatus 2.

Moreover, the JOB management unit 21 for carrying out management of jobs is constructed by a program for carrying out the management of jobs, a flash memory for storing management data in a nonvolatile manner, and the like. These components may share a part of a configuration of the image-forming-apparatus control unit 20.

Further, the image processing unit 22 is connected in a controllable manner to the image-forming-apparatus control unit 20. Image reading unit which is used for acquiring image data from a document, and is not shown is provided on the image processing unit 22. The image reading unit is provided with a scanner unit, an automatic document feeder, and the like, and generates image data by reading a document or the like. It should be noted that the image data may be acquired outside the image forming apparatus 2, and is transferred via the network 10 and the printer controller 5 to the image forming apparatus 2. Moreover, the image processing unit 22 is provided with an image forming unit. The image forming unit charges a photoreceptor by an electrifier unit, generates a latent image on the photoreceptor based on the image data by an LD unit, develops the latent image by a developer unit, transfers the developed latent image via a transfer unit to a sheet, thereby forming an image, and fixes the image by a fixer unit for example.

Further, the display unit 23 is connected in a controllable manner to the image-forming-apparatus control unit 20. The display unit 23 is controlled by the image-forming-apparatus control unit 20, and displays proper information on the image forming apparatus 2. Moreover, an operator can carry out with display unit 23 a predetermined operation such as an instruction to divide a job on the image forming apparatus 2. The display and the operation may be carried out independently of each other on the display unit 23, and the operation may be carried out on a display screen such as that on an LCD touch panel.

Moreover, the post-processing setting unit 24 is connected in a controllable manner to the image-forming-apparatus control unit 20. A post-processing mode applied to a sheet after the image forming, namely a content of the post-processing, a selection of a post-processing apparatus, positions of punching, number of bundled sheets for stapling, number of copies, and the like is set in the post-processing setting unit 24. Moreover, determination of availability of the manual processing, and setting in the manual processing can also be carried out.

The post-processing setting unit 24 may be provided independently of the display unit 23, or the display unit 23 may be used also as the post-processing setting unit 24. A set content by the post-processing setting unit 24 is notified to the image-forming-apparatus control unit 20.

Further, the sheet feeding unit 25 is connected in a controllable manner to the image-forming-apparatus control unit 20. The sheet feeding unit 25 is provided with a sheet feeding trays which stores sheets on which an image is to be formed, and is not shown, and the image-forming-apparatus control unit 20 controls selection of a sheet feeding tray to be used, a sheet feeding timing, and an operation of sheet feeding rollers.

Further, the abnormality detection unit 26 for detecting an abnormality of the image forming apparatus 2 is connected to the image-forming-apparatus control unit 20. The abnormality detection unit 26 can be constructed by various sensors, and detects an abnormality in the sheet feeding, an abnormality in transport, an abnormality in image processing, an abnormality of display, an abnormality of door opening on the image forming apparatus main body, and the capability of carrying out the post-processing. A detection result by the abnormality detection unit 26 is notified to the image-forming-apparatus control unit 20, and the image-forming-apparatus control unit 20 discriminates an abnormality and whether a job can be executed or not based on the detection result.

Moreover, the network connection unit 27 is connected to the image-forming-apparatus control unit 20 in a controllable manner, and the network connection unit 27 is connected to the network 10, thereby enabling communication among the image forming apparatuses and communication with the PC terminals 11 and 12.

The network connection unit 27 constructs a communication unit of the present invention along with the printer controller 5.

The post-processing I/F unit 28 is an interface for connecting the image forming apparatus main body 2a and the post-processing apparatus 2b via a serial bus. Model information on the image forming apparatus main body 2a, information on a job (post-processing mode, transported sheet number, and partition information), reservation information, and the like are notified.

The image forming apparatus 3 has the similar configuration as that of the image forming apparatus 2, and the image forming apparatus 3 is provided with, in addition to the image-forming-apparatus control unit 30, a JOB management unit 31, an image processing unit 32, a display unit 33, a post-processing setting unit 34, a sheet feeding unit 35, an abnormality detection unit 36, a network connection unit 37, and a post-processing I/F unit 38 as main components. The image-forming-apparatus control unit 30 has the same functions as those of the image-forming-apparatus control unit 20; the JOB management unit 31 has the similar functions as those of the JOB management unit 21; image processing unit 32 has the similar functions as those of the image processing unit 22; the display unit 33 has the similar functions as those of the display unit 23; the post-processing unit 34 has the similar functions as those of the post-processing unit 24; the sheet feeding unit 35 has the similar functions as those of the sheet feeding unit 25; the abnormality detection unit 36 has the similar functions as those of the abnormality detection unit 26; the network connection unit 37 has the similar functions as those of the network connection unit 27; and the post-processing I/F unit 38 has the similar functions as those of the post-processing I/F unit 28. A detailed description thereof is therefore omitted.

Figure 3:
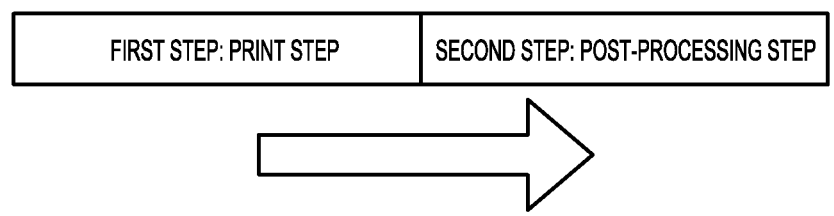
FIG. 3 is a conceptual diagram showing a job including multiple steps according to the embodiment of the present invention.

FIG. 3 is a conceptual diagram of a job for sequentially processing multiple steps. In the job, a first step constructed by a print step, and a second step constructed by a post-processing step are arranged in sequence, and are unified as a whole. The first step is processed by the image forming apparatus main body, and the second step is processed by the post-processing apparatus. In the embodiment, the job grouped as a whole can be divided into two jobs including a divided step job constructed by the first step, and a second divided step job constructed by the second step. A position for the division is between the steps which are respectively unified to some degree according to the embodiment. A job is usually divided into the print step and the post-processing step, and if the post-processing step extends over multiple steps, the post-processing step may be divided into these steps. The each divided step job may be constructed by one step or may be constructed by two or more steps, and the number of steps may vary depending on the divided step job.

In this case, the former divided step job is the print processing step job and the latter part of the divided step jobs is the post-processing step job.

In this embodiment, the above-mentioned image forming apparatuses 2 and 3 are connected to the network 10, post-processing apparatuses B, C, and D having the manual post-processing function are connected to the image forming apparatus 2, and a post-processing apparatus A not having the manual post-processing function is connected to the image forming apparatus 3.

If a job accompanying manual post-processing is input into the image forming apparatus 3 not having the manual post-processing function, it is first determined whether the job can be executed on the image forming apparatus 3. In this case, the job cannot be executed by the image forming apparatus 3 alone, and it is determined whether the manual prost processing can be executed on another image forming apparatus or not. In this embodiment, the manual post-processing can be executed on the image forming apparatus 2. Based on the determination that the manual post-processing can be executed, the job is divided in the divided step job (print job) relating to the print step, and the divided step job (manual post-processing job) relating to the post-processing.

According to the description before, by dividing a job, executing and reserving divided jobs on different image forming apparatuses, a former part of divided step job is executed on an image forming apparatus which can execute the former job, and by reserving a latter part of the divided step jobs to an image forming apparatus which can execute the latter job, the job can be efficiently processed without a delay. The reservation can secure a prioritized use, and after the former divided step job is executed, the latter part of the divided step jobs can be executed without delay.

When the former divided step job is executed on an image forming apparatus, if the image forming apparatus is not the own image forming apparatus, an output request accompanying image transfer, for example, from an image forming apparatus or a server to the different image forming apparatus is made. Moreover, when the latter part of the divided step jobs is executed on an image forming apparatus, if the image forming apparatus is not the own image forming apparatus, a reservation request, for example, from an image forming apparatus or a server to the different image forming apparatus is made.

Figure 4:
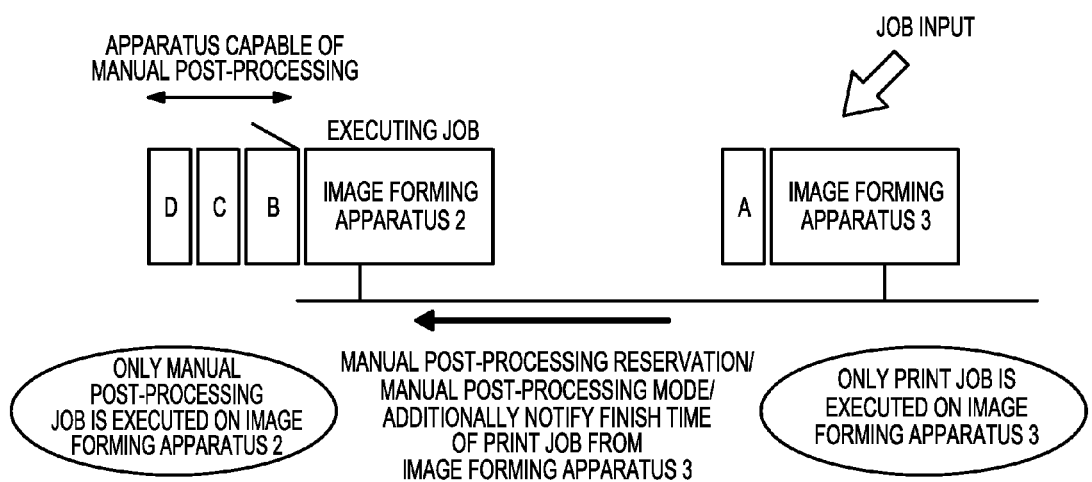
FIG. 4 is a conceptual diagram for processing divided step jobs between image forming apparatuses connected to a network according to the embodiment of the present invention.
Figure 5:
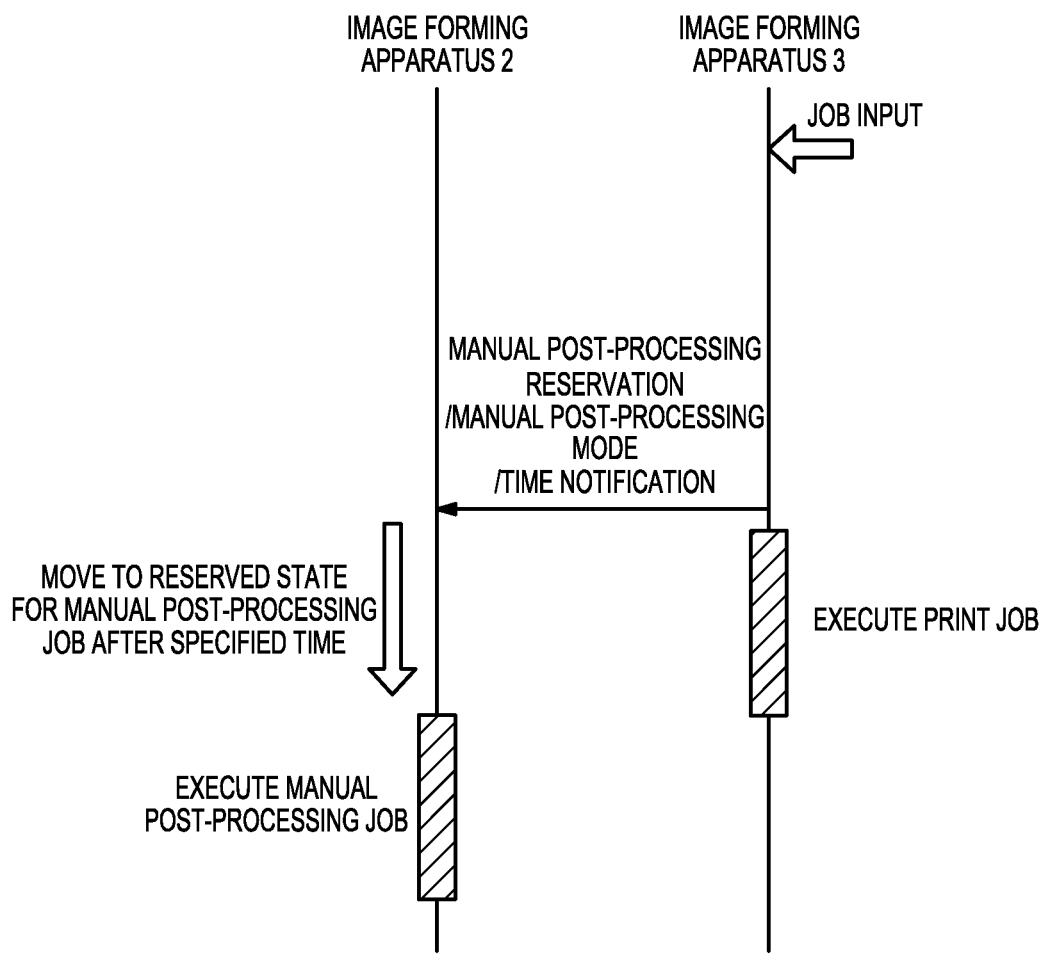
FIG. 5 is a ladder diagram of an example of processing divided step jobs between the image forming apparatuses connected to the network according to the embodiment of the present invention.

Then, only the print job is executed on the image forming apparatus 3 without the manual post-processing function, and the reservation request for the manual post-processing job is notified to the image forming apparatus 2 which can carry out the manual post-processing as illustrated in FIG. 4 and FIG. 5. In other words, a post-processing apparatus which can carry out the manual post-processing can be used as a reservation destination of the divided step job. A manual post-processing request, for example, is made upon the reservation. The image forming apparatus 2 which can carry out the manual post-processing receives the request, brings the execution of the manual post-processing job into a reserved state, and waits for the start of the manual post-processing. After the print output is finished on the image forming apparatus 3 not having the manual post-processing function, a desired output is obtained by carrying out the reserved manual post-processing on the image forming apparatus 2 having the manual post-processing function.

As mentioned above, a reservation for execution in a proper timing can be made based on the timing in which the former divided step job is finished, and a case where the reservation is made for too an early timing, and thus processing for other jobs is interrupted, and a case where the reservation is made late, thus other jobs and reservations are executed and a wait time is generated can be avoided. A print finish time notification, for example, can be mentioned as the finish timing.

If the manual post-processing job is brought into the reserved state, though the image forming apparatus 2 permits the reception and execution of a job in an ordinary manner until the specified time for the reservation, the received job is not immediately executed if an estimated finish time of the job exceeds the time for reservation, and is started after the manual post-processing job is finished.

When the time for reservation is reached, a state where the start of the post-processing manual job is waited for can be displayed on the display unit of the image forming apparatus 2, and a user name and a job ID of the input job may be additionally displayed.

As mentioned above, a proper execution timing can be reserved on the own apparatus by receiving a notification of a timing in which a former divided step job is finished on another image forming apparatus.

Figure 6:
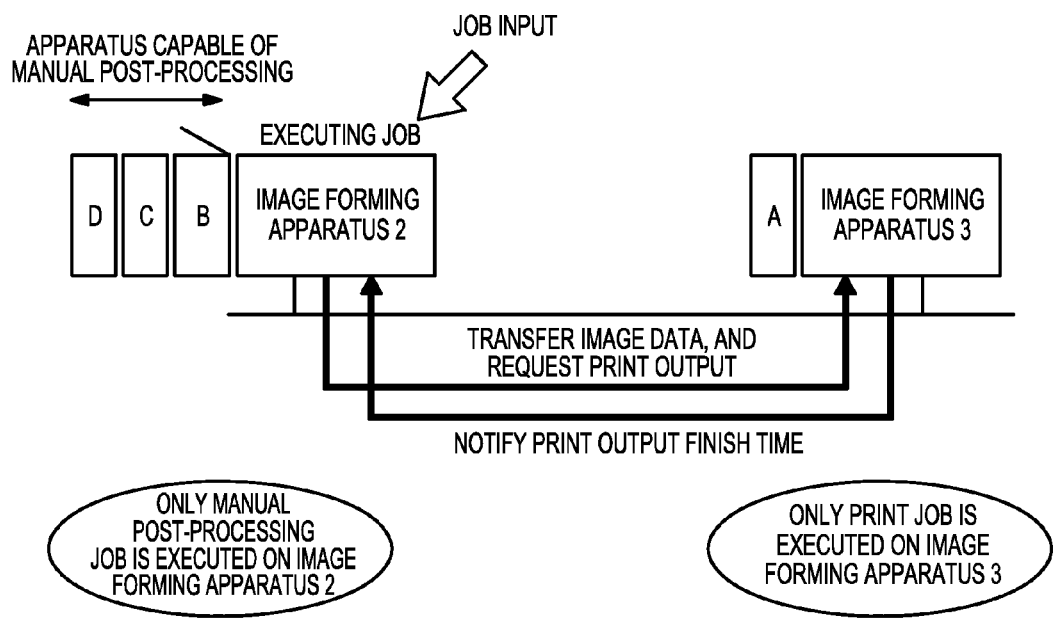
FIG. 6 is a conceptual diagram of another example of processing divided step jobs between the image forming apparatuses connected to the network according to the embodiment of the present invention.
Figure 7:
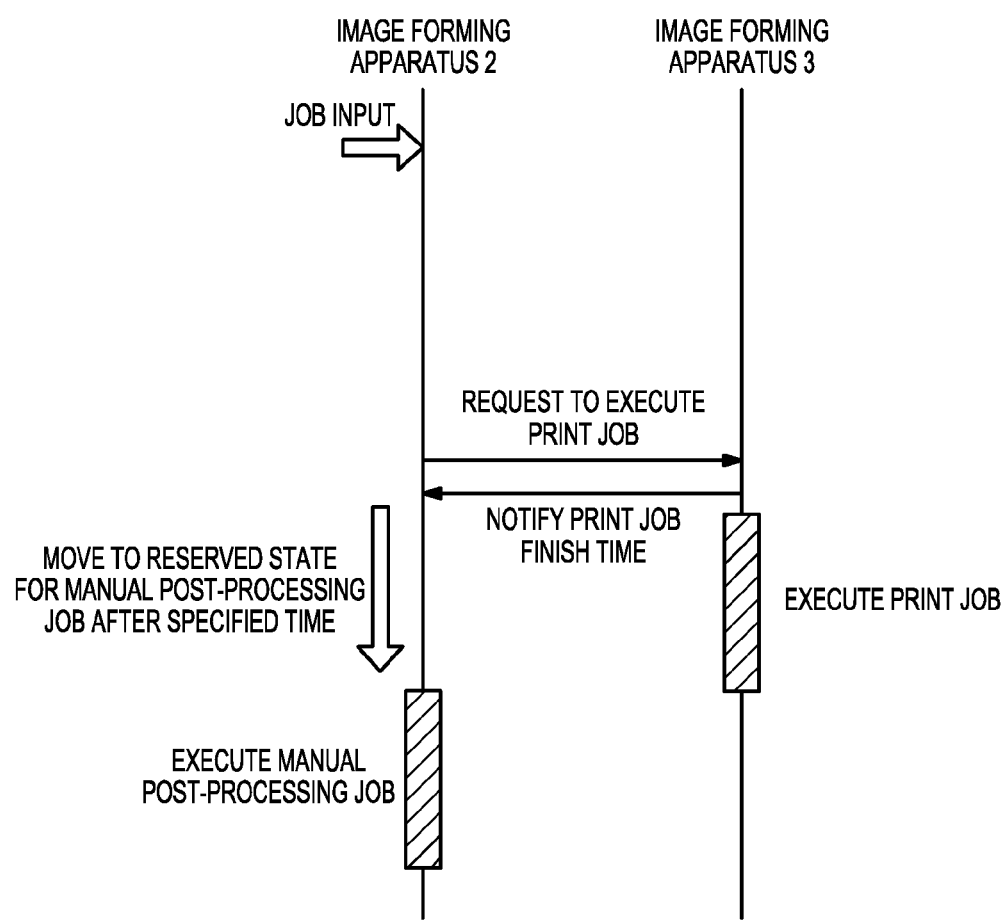
FIG. 7 is a ladder diagram of still another example according to the embodiment of the present invention.

A description will now be given of a case in which a job is input to the image forming apparatus 2 referring to FIG. 6 and FIG. 7. The control unit of the image forming apparatus 2 determines whether or not the job can be executed on the image forming apparatus 2 on this occasion. If the immediate execution is not possible, the control unit determines whether the print job can be executed on another image forming apparatus. Specifically, the control unit inquires of other image forming apparatus whether a print output is available or not, thereby searching for an image forming apparatus which can output the print. The control unit determines whether the print job can be executed on another image forming apparatus based on a search result. In this example, the printing can be immediately carried out on the image forming apparatus 3.

If the print job can be executed on the image forming apparatus 3, the job is divided into the print job and the manual post-processing job, and print data is transferred to the image forming apparatus 3, thereby requesting the execution of the print job. The image forming apparatus 3 notifies the image forming apparatus 2 of a print processing period as a finish timing upon the reception of the print data and the print request. The image forming apparatus 2 moves to the reserved state for the manual post-processing job after the print finish time. Other job is prohibited from being executed in the reserved state, and if other job is input in the reserved state, the input job is reserved as a job after the manual post-processing job. If other job will be finished before the reservation time for the manual post-processing, the execution job may be permitted.

Figure 8:
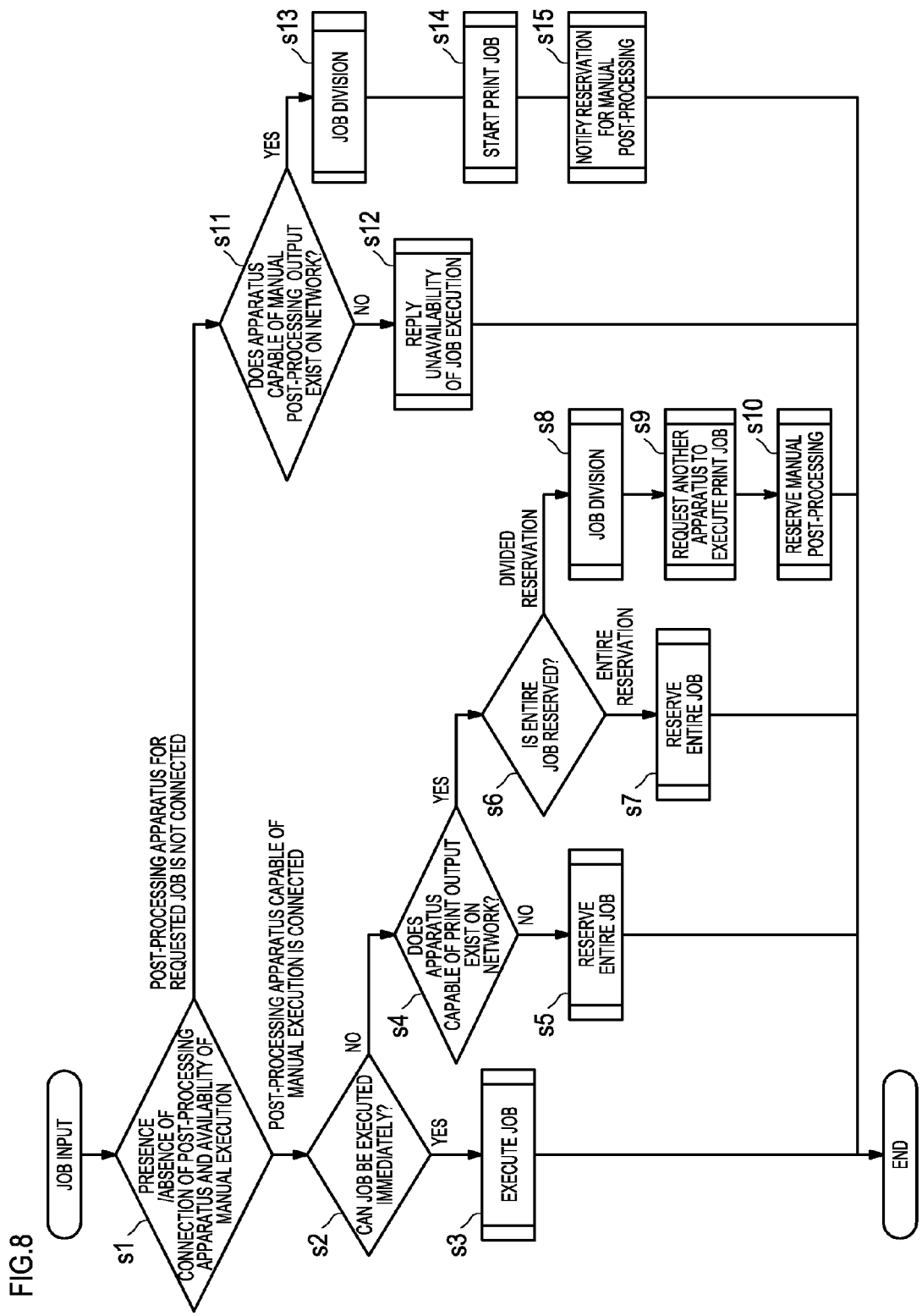
FIG. 8 is a flowchart showing a procedure of processing including job division after a job is input according to the embodiment of the present invention.

A description will now be given of processing steps where a job is input into the image forming apparatus, the job is divided, and other is performed, based on a flowchart in FIG. 8.

As a result of an input of a job, it is determined whether a post-processing apparatus is connected or not, and whether the manual execution is available or not (Step s1). If a post-processing apparatus permitting the manual execution is connected to a subject image forming apparatus (Post-processing apparatus is connected in Step s1), a determination whether immediate execution is possible or not is made (Step s2). If the immediate execution is possible (Yes in Step s2), the job is executed (Step s3), and the processing is finished after.

If the immediate execution is not possible (No in Step s2), it is determined whether an image forming apparatus which can output the print exists on the network (Step s4). If an image forming apparatus which can output the print output does not exist (No in Step s4), a reservation for the entire job is made on the image forming apparatus to which the job is input (Step s5), and the processing is finished after. If the image forming apparatus which can output the print (Yes in Step s4), it is determined that the entire job is reserved or not (Step s6). The entire reservation can be made if the image forming apparatus can execute the print job and the post-processing job. If the entire job is reserved (Entire reservation in Step s6), the entire job reservation is made on the other image forming apparatus (Step S7), and the processing is finished. If the entire job is not reserved (Divided reservation in Step s6), the job is divided into the print job and the post-processing job (Step s8), and the other image forming apparatus is requested to execute the print job (Step s9). Then, the manual post-processing is reserved on the own apparatus (Step s10), and the processing is finished. The manual post-processing reservation is such a reservation that a notification of the finish timing is received from the image forming apparatus which is requested to execute the print job, and an execution time is determined according to the finish timing.

If the image forming apparatus to which the job is input does not connect to a post-processing apparatus for the requested job in Step s1, it is determined whether an image forming apparatus which can output the manual post-processing exists on the network (Step s11). If an image forming apparatus which can output the manual post-processing does not exist (No in Step s11), such a response that the job cannot be executed is made (Step s12), and the processing is finished after. If there is an image forming apparatus which can output the manual post-processing (Yes in Step s11), the job is divided into the print job and the post-processing job (Step s13), the print job is started on the own apparatus (Step s14), a notification for reserving the manual post-processing including the finish timing is made to the other executable image forming apparatus (Step s15), and the processing is finished after.

Figure 9:
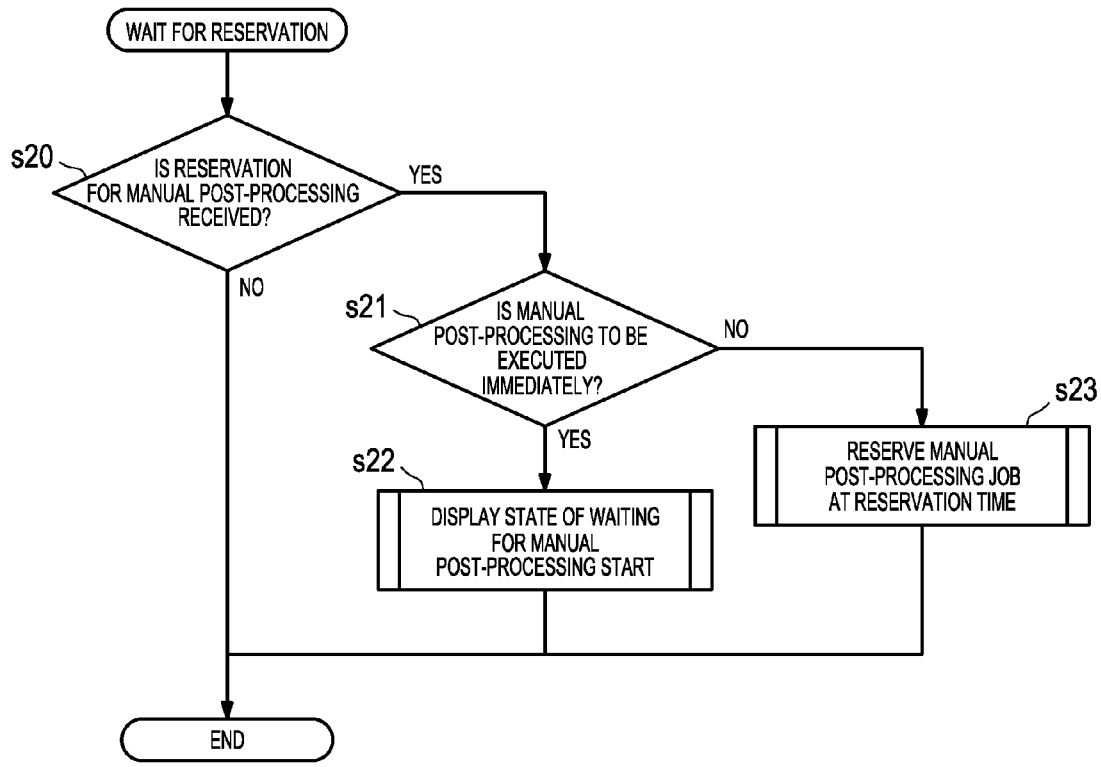
FIG. 9 is a flowchart showing a procedure on an apparatus receiving a reservation for a divided job according to the embodiment of the present invention.

A description will now be given of a processing procedure of an image forming apparatus waiting for a reservation referring to a flowchart in FIG. 9. The processing procedure is carried out by the control unit of the image forming apparatus on which a job is reserved.

It is determined whether a reservation for the manual post-processing is received or not while a reservation is waited for (Step s20). If a reservation is not received, the processing is finished (No in Step s20). If a reservation is received (Yes in Step s20), it is determined whether the manual post-processing job is to be executed immediately or not (Step s21), and if the manual post-processing job is to be executed immediately (Yes in Step s21), the state of waiting for the start of the manual post-processing is displayed on the display unit (Step s22), and the processing is finished. If the manual post-processing job is not to be executed immediately (No in Step s21), the manual post-processing job is reserved at a reservation time (Step s23), and the processing is finished.

Figure 10:
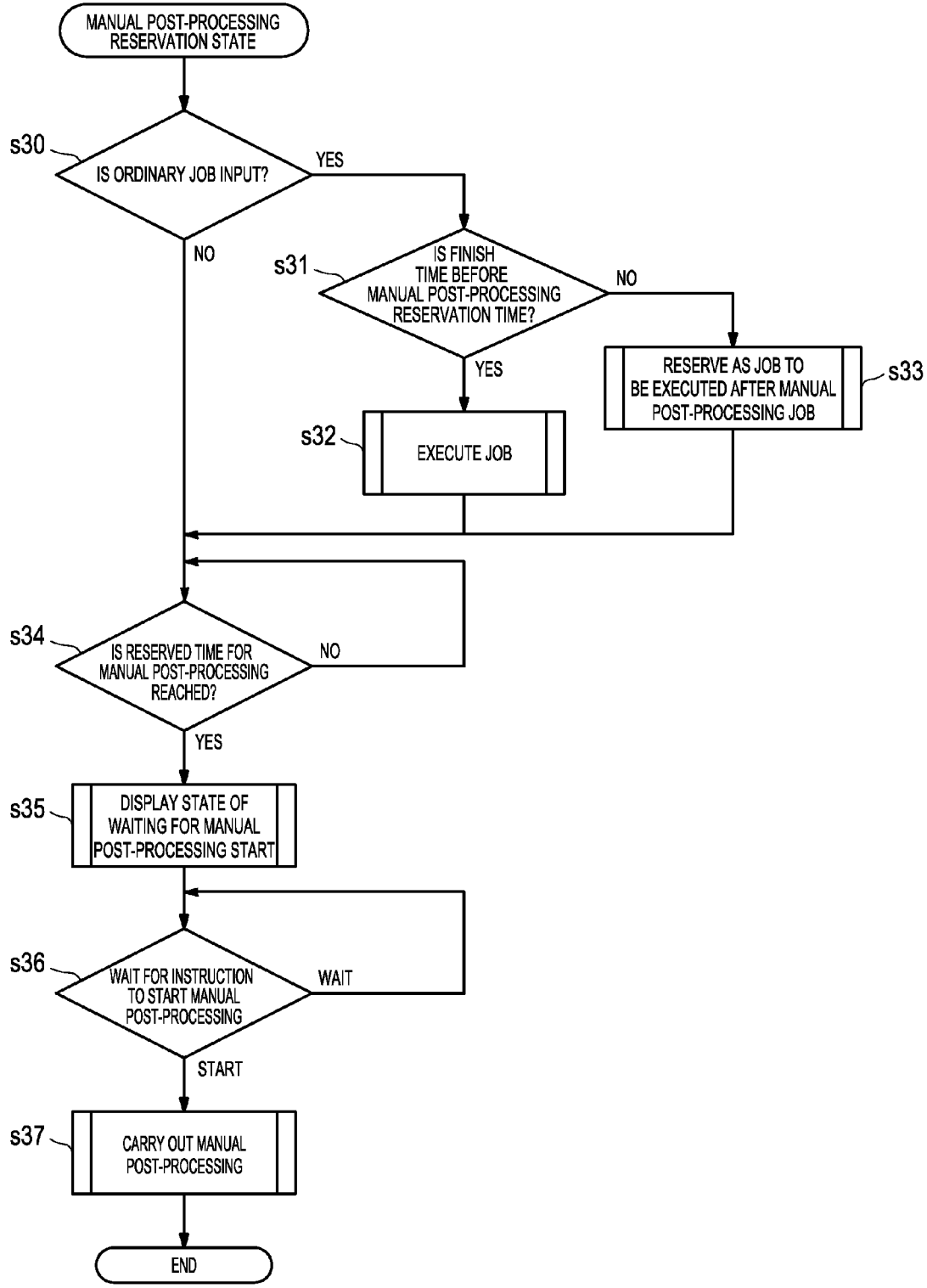
FIG. 10 is a flowchart showing a procedure on an apparatus receiving an instruction to execute a divided job according to the embodiment of the present invention.

A description will now be given of a procedure in the manual post-processing reservation state referring to a flowchart in FIG. 10. The procedure is carried out by the control unit of an image forming apparatus on which a reservation is made.

First, it is determined whether an ordinary job is input or not (Step s30). If an ordinary job is input (Yes in Step s30), it is determined whether the finish time is before a manual post-processing reservation time or not (Step s31). If the job can be finished before the reservation time (Yes in Step s31), the input ordinary job is executed immediately (Step s32), and if the job cannot be finished before the reservation time (No in Step s31), the input ordinary job is reserved as a job to be executed after the manual post-processing job (Step s33).

If an ordinary job is not input in Step s30 (No in Step s30), or after Step s32 or s33 is carried out, the reservation time for the manual post-processing is waited for (Step s34). If the reservation time for the manual post-processing is reached (Yes in Step s34), the state of waiting for start of the manual post-processing is displayed on the display unit (Step s35), and an instruction to start the manual post-processing is waited for (Step s36). If an instruction to start the manual post-processing is made (Start in Step s36), the manual post-processing is carried out (Step s37), and the processing is finished.

Figure 11:
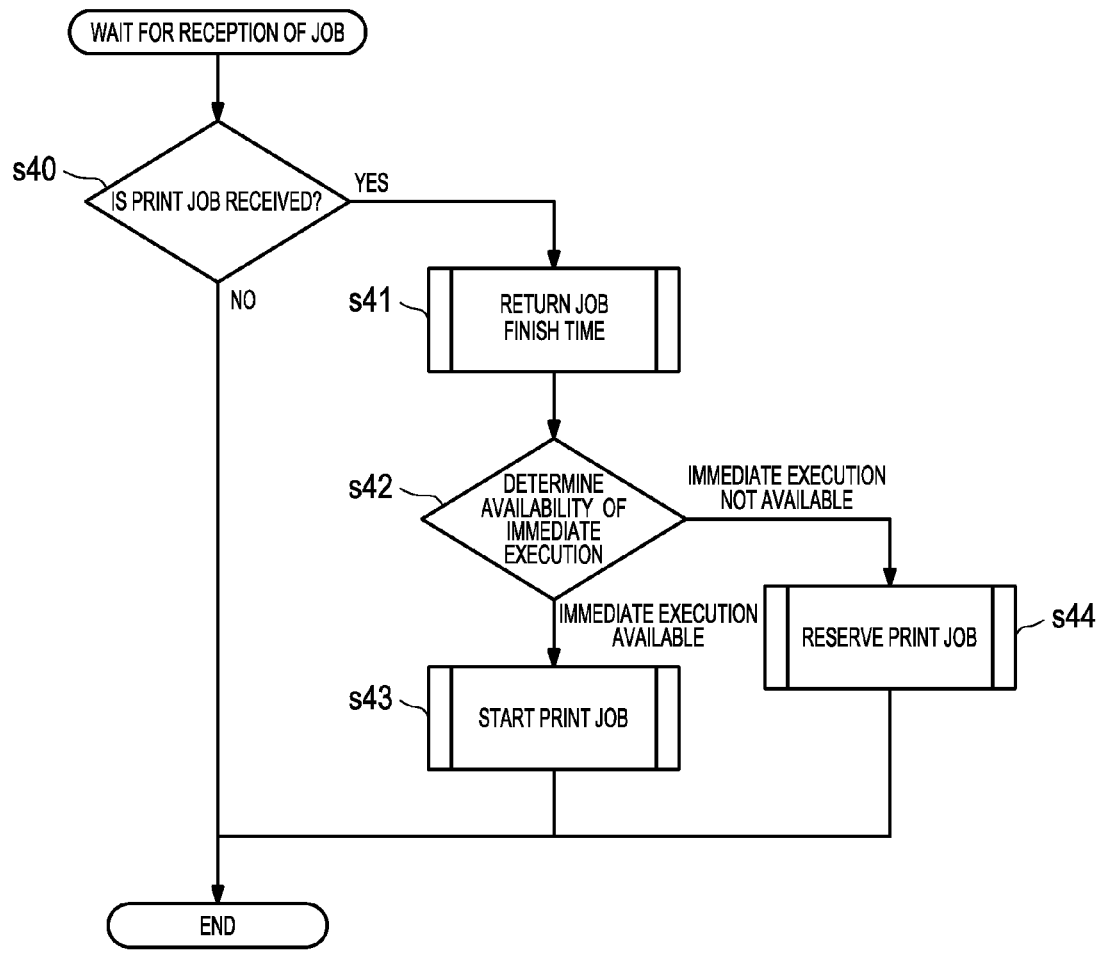
FIG. 11 is a flowchart showing a procedure on an apparatus on which a divided job is reserved according to the embodiment of the present invention.

A description will now be given of a procedure for receiving the divided print job referring to a flowchart in FIG. 11. The procedure is carried out by the control unit of an image forming apparatus on which the print job, which is the first step, is executed.

First, it is determined whether the print job is received or not (Step s40). If the print job is not received (No in Step s40), the processing is finished, and if the print job is received (Yes in Step s40), the job finish time is calculated, and the job finish time is returned to an apparatus which has instructed to execute the print job (Step s41). Then, whether the print job can be executed immediately or not is determined (Step s42). If the print job can be executed immediately (Immediate execution available in Step s42), the print job is started (Step s43), and the processing is finished after. If the print job cannot be executed immediately (Immediate execution not available in Step s42), the print job is reserved (Step s44), and the processing is finished after.

Though a description is given of the embodiment where the control unit provided for the image forming apparatus carries out the control such as the division of a job, a control unit provided for a server which is not shown, or the PC terminal 11 or 12 which is connected to the network 10, may carry out the control such as the division of a job.

As mentioned above, the embodiment of the present invention provides such an effect that if one image forming apparatus first carries out a print of a former divided step job, and a latter part of the divided step jobs such as the post-processing is carried out after the former job is finished, the entire job can be finished earlier (time reduction).

Moreover, such an effect that even if a job including post-processing is input to an apparatus on which a post-processing apparatus is not available, a desired output can be obtained by multiple apparatuses carrying out divided processing is provided.

Moreover, such an effect that if an apparatus which is requested to carry out a print output, and an apparatus which is requested to carry out the post-processing are different from each other, the operation is made easy is provided.

As above, while the present invention has been described based on the embodiment described above, the present invention is not limited to the contents of the above-described embodiment and can be appropriately changed within the scope of the present invention.

What is claimed is:

1. A non-transitory computer-readable storage medium having stored thereon a program that is executable by a computer which manages a job and which connects to a plurality of image forming apparatuses for printing an image on a sheet based on the job and outputting the image via a network, the program causing the computer to perform functions comprising:
   dividing the job, which includes sequentially processing a plurality of steps, into a plurality of divided step jobs;
   executing a former one of the plurality of divided step jobs on a first image forming apparatus from among the plurality of image forming apparatuses which can execute the former one of the plurality of divided step jobs;
   reserving an execution starting time of a latter one of the plurality of divided step jobs on a second image forming apparatus which is from among the plurality of image forming apparatuses, which can execute the latter one of the plurality of divided step jobs, and which is different from the first image forming apparatus, wherein the latter one of the plurality of divided step jobs is executed at the reserved execution starting time on the second image forming apparatus;
   receiving an other job for the second image forming apparatus after the reservation of the latter one of the plurality of divided step jobs;
   when receiving the other job, determining whether or not the other job can be finished before the reserved execution starting time of the latter one of the plurality of divided step jobs;
   executing the other job on the second image forming apparatus before the reserved execution starting time of the latter one of the plurality of divided step jobs when it is determined that the other job can be finished before the reserved execution starting time of the latter one of the plurality of divided step jobs; and
   reserving the other job as a job to be executed after the reserved latter one of the plurality of divided step jobs when it is determined that the other job cannot be finished before the reserved execution starting time of the latter one of the plurality of divided step jobs.

2. The non-transitory computer-readable storage medium according to claim 1, wherein the plurality of image forming apparatuses include at least one image forming apparatus comprising a post-processing apparatus which can carry out manual post-processing.

3. The non-transitory computer-readable storage medium according to claim 1, wherein the execution starting time of the latter one of the plurality of divided step jobs is instructed to the second image forming apparatus based on a timing in which the former one of the plurality of divided step jobs finishes.

4. The non-transitory computer-readable storage medium according to claim 3, wherein the program further causes the computer to perform functions comprising:
   receiving a notification on the timing in which the former one of the plurality of divided step jobs finishes from the first image forming apparatus executing the former one of the plurality of divided step jobs; and
   executing a control of instructing the execution starting time of the latter one of the plurality of divided step jobs to the second image forming apparatus after receiving the notification on the timing.

5. The non-transitory computer-readable storage medium according to claim 1, wherein the second image forming apparatus is an image forming apparatus to which the job is input.

6. The non-transitory computer-readable storage medium according to claim 1, wherein the first image forming apparatus is an image forming apparatus to which the job is input.

7. The non-transitory computer-readable storage medium according to claim 1, wherein the job includes a first step and a second step, wherein the plurality of divided step jobs include a first divided step job and a second divided step job, and wherein the second step relates to post-processing.

8. The non-transitory computer-readable storage medium according to claim 1, wherein the program further causes the computer to perform functions comprising:
determining whether or not the image forming apparatus to which the job is input can execute the job in its entirety; and
determining whether or not there are plural image forming apparatuses from among the plurality of image forming apparatuses which can respectively execute parts of steps of the job and the entire job can be distributed to and processed by said plural image forming apparatuses,
wherein when it is determined that the image forming apparatus to which the job is input cannot execute the job in its entirety, and that there are said plural image forming apparatuses which can respectively execute parts of steps of the job and the entire job can be distributed to and processed by said plural image forming apparatuses, the job is divided into a plurality of jobs based on a number of said plural image forming apparatuses executing the job.

9. The non-transitory computer-readable storage medium according to claim 1, wherein the former one of the plurality of divided step jobs relates to printing, and the latter one of the plurality of divided step jobs relates to post-processing.

10. The non-transitory computer-readable storage medium according to claim 1, wherein the former one of the plurality of divided step jobs relates to a first post-processing, and the latter one of the plurality of divided step jobs relates to a second post-processing.

11. The non-transitory computer-readable storage medium according to claim 1, wherein a manual post-processing of at least one of the plurality of image forming apparatuses includes performing at least one of punching and stapling.

12. The non-transitory computer-readable storage medium according to claim 1, wherein the program further causes the computer to perform a function comprising displaying, on a display unit of the second image forming apparatus, a state where a start of a post-processing manual job is waited for when the execution starting time of the reserved latter one of the plurality of divided step jobs is reached on the second image forming apparatus.

13. The non-transitory computer-readable storage medium according to claim 12, wherein the program further causes the computer to perform a function comprising displaying at least one of a user name who inputs the job and an identification of the latter one of the plurality of divided step jobs.

14. The non-transitory computer-readable storage medium according to claim 1, wherein the program further causes the computer to perform a function comprising determining at least one image forming apparatus from among the plurality of image forming apparatuses at which a print output is available by inquiring with the plurality of image forming apparatuses.

15. A server comprising the non-transitory computer-readable storage medium according to claim 1.

16. A non-transitory computer-readable storage medium having stored thereon a program for a computer of an image forming apparatus which prints an image on a sheet based on a job and which is from among a plurality of image forming apparatuses connected to each other in a communicable manner via a network, the program causing the computer to perform functions comprising:
receiving a reservation of an execution starting time of a latter one of a plurality of divided step jobs into which the job is divided by another one of the plurality of image forming apparatuses, wherein the latter one of the plurality of divided step jobs is executed at the reserved execution starting time on the image forming apparatus itself;
receiving an other job after receiving the reservation of the latter one of the plurality of divided step jobs;
when receiving the other job, determining whether or not the other job can be finished before the reserved execution starting time of the latter one of the plurality of divided step jobs;
executing the other job before the reserved execution starting time of the latter one of the plurality of divided step jobs when it is determined that the other job can be finished before the reserved execution starting time of the latter one of the plurality of divided step jobs; and
reserving the other job as a job to be executed after the reserved latter one of the plurality of divided step jobs when it is determined that the other job cannot be finished before the reserved execution starting time of the latter one of the plurality of divided step jobs.

17. The non-transitory computer-readable storage medium according to claim 16, wherein the execution starting time of the latter one of the plurality of divided step jobs is reserved on the image forming apparatus based on a timing in which a former one of the plurality of divided step jobs finishes on the other image forming apparatus.

18. The non-transitory computer-readable storage medium according to claim 17, wherein the program further causes the computer to perform functions comprising:
receiving a notification on the timing in which the former one of the plurality of divided step jobs finishes from the other image forming apparatus executing the former one of the plurality of divided step jobs; and
executing a control of reserving the execution starting time of the latter one of the plurality of divided step jobs on the image forming apparatus itself after receiving the notification on the timing.

19. The non-transitory computer-readable storage medium according to claim 17, wherein the former one of the plurality of divided step jobs relates to printing, and the latter one of the plurality of divided step jobs relates to post-processing.

20. The non-transitory computer-readable storage medium according to claim 17, wherein the former one of the plurality of divided step jobs relates to a first post-processing, and the latter one of the plurality of divided step jobs relates to a second post-processing.

21. The non-transitory computer-readable storage medium according to claim 16, wherein the program further causes the computer to perform functions comprising:
receiving an input of the job; and
reserving the execution starting time of the latter one of the plurality of divided step jobs on the image forming apparatus itself after receiving the input of the job.

22. The non-transitory computer-readable storage medium according to claim 16, wherein the job includes a first step and a second step, wherein the plurality of divided step jobs include a first divided step job and a second divided step job, and wherein the second step relates to post-processing.

23. The non-transitory computer-readable storage medium according to claim 16, wherein a manual post-processing of at least one of the plurality of image forming apparatuses includes performing at least one of punching and stapling.

24. The non-transitory computer-readable storage medium according to claim 16, wherein the program further causes the computer to perform a function comprising displaying, on a display unit of the image forming apparatus, a state where a start of a post-processing manual job is waited for when the execution starting time of the reserved latter one of the plurality of divided step jobs is reached.

25. The non-transitory computer-readable storage medium according to claim 16, wherein the program further causes the computer to perform a function comprising displaying at least one of a user name who inputs the job and an identification of the latter one of the plurality of divided step jobs.

26. The image forming apparatus comprising the non-transitory computer-readable storage medium according to claim 16.

27. A non-transitory computer-readable storage medium having stored thereon a program for a computer of an image forming apparatus which prints an image on a sheet based on a job and which is from among a plurality of image forming apparatuses connected to each other in a communicable manner via a network, the program causing the computer to perform functions comprising:
dividing the job, which includes sequentially processing a plurality of steps, into a plurality of divided step jobs;
executing a former one of the plurality of divided step jobs on another one of the plurality of image forming apparatuses which can execute the former one of the plurality of divided step jobs;
reserving an execution starting time of a latter one of the plurality of divided step jobs on the image forming apparatus itself, wherein the latter one of the plurality of divided step jobs is executed at the reserved execution starting time on the image forming apparatus itself;
receiving an other job after the reservation of the latter one of the plurality of divided step jobs;
when receiving the other job, determining whether or not the other job can be finished before the reserved execution starting time of the latter one of the plurality of divided step jobs;
executing the other job before the reserved execution starting time of the latter one of the plurality of divided step jobs when determining that the other job can be finished before the reserved execution starting time of the latter one of the plurality of divided step jobs; and
reserving the other job as a job to be executed after the reserved latter one of the plurality of divided step jobs when determining that the other job cannot be finished before the reserved execution starting time of the latter one of the plurality of divided step jobs.

28. The non-transitory computer-readable storage medium according to claim 27, wherein the execution starting time of the latter one of the plurality of divided step jobs is reserved on the image forming apparatus based on a timing in which execution of the former one of the plurality of divided step jobs finishes on the other image forming apparatus.

29. The non-transitory computer-readable storage medium according to claim 27, wherein the program further causes the computer to perform a function comprising determining at least one image forming apparatus from among the plurality of image forming apparatuses on which a print output is available by inquiring with the plurality of image forming apparatuses.

30. The non-transitory computer-readable storage medium according to claim 27, wherein the program further causes the computer to perform functions comprising:
determining whether or not the image forming apparatus to which the job is input can execute the job in its entirety;
determining whether or not there are other image forming apparatuses from among the plurality of image forming apparatuses which can respectively execute parts of steps of the job and the entire job can be distributed to and processed by plural image forming apparatuses; and
when it is determined that the image forming apparatus to which the job is input cannot execute the job in its entirety, and that there are other image forming apparatuses which can respectively execute parts of steps of the job and the entire job can be distributed to and processed by the plural image forming apparatuses, dividing the job into a plurality of jobs based on a number of the plural image forming apparatuses executing the job.

31. The image forming apparatus comprising the non-transitory computer-readable storage medium according to claim 27.

32. A non-transitory computer-readable storage medium having stored thereon a program that is executable by a computer which manages a job and which connects to a plurality of image forming apparatuses for printing an image on a sheet based on the job and outputting the image via a network, the program causing the computer to perform functions comprising:
dividing the job, which includes sequentially processing a plurality of steps, into a plurality of divided step jobs;
executing a first one of the plurality of divided step jobs on a first image forming apparatus from among the plurality of image forming apparatuses which can execute the first one of the plurality of divided step jobs;
reserving an execution starting time of a second one of the plurality of divided step jobs on a second image forming apparatus from among the plurality of image forming apparatuses which can execute the second one of the plurality of divided step jobs, and which is different from the first image forming apparatus, wherein the second one of the plurality of divided step jobs is executed at the reserved execution starting time on the second image forming apparatus;
receiving an other job for the second image forming apparatus after the reservation of the second one of the plurality of divided step jobs on the second image forming apparatus;
when receiving the other job, determining whether or not the other job can be finished before the reserved execution starting time of the second one of the plurality of divided step jobs on the second image forming apparatus;
executing the other job on the second image forming apparatus before the reserved execution starting time of the second one of the plurality of divided step jobs when it is determined that the other job can be finished before the reserved execution starting time of the second one of the plurality of divided step jobs; and
reserving the other job as a job to be executed after the reserved second one of the plurality of divided step jobs when it is determined that the other job cannot be finished before the reserved execution starting time of the second one of the plurality of divided step jobs on the second image forming apparatus.

* * * * *